United States Patent
Nakamura

(10) Patent No.: US 9,995,877 B2
(45) Date of Patent: Jun. 12, 2018

(54) OPTICAL CIRCUIT ELEMENT AND CONFIGURATION METHOD FOR THE OPTICAL CIRCUIT ELEMENT

(71) Applicant: NEC Corporation, Minato-ku, Tokyo (JP)

(72) Inventor: Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

(21) Appl. No.: 15/509,253

(22) PCT Filed: Sep. 11, 2015

(86) PCT No.: PCT/JP2015/004646
§ 371 (c)(1),
(2) Date: Mar. 7, 2017

(87) PCT Pub. No.: WO2016/047079
PCT Pub. Date: Mar. 31, 2016

(65) Prior Publication Data
US 2017/0276872 A1 Sep. 28, 2017

(30) Foreign Application Priority Data
Sep. 22, 2014 (JP) .................. 2014-192232

(51) Int. Cl.
*G02B 6/125* (2006.01)
*G02B 6/12* (2006.01)

(52) U.S. Cl.
CPC ...... *G02B 6/125* (2013.01); *G02B 2006/1209* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| 5,138,687 A | 8/1992 | Horie et al. |
| 9,164,026 B2 * | 10/2015 | Chakravarty .......... B82Y 20/00 |
| 2004/0258361 A1 | 12/2004 | Telkamp et al. |

FOREIGN PATENT DOCUMENTS

| JP | H03-168718 | 7/1991 |
| JP | H05-60929 A | 3/1993 |

(Continued)

OTHER PUBLICATIONS

International Search Report for PCT Application No. PCT/JP2015/004646, dated Nov. 10, 2015.

(Continued)

*Primary Examiner* — Uyen Chau N Le
*Assistant Examiner* — Chad H Smith

(57) ABSTRACT

In order to solve the problem of making optical signals pass at a low loss and low polarization dependence, this optical circuit element is configured from rib-type optical waveguides, each of which is configured from a core region, including a planar slab and protruding ribs, and cladding regions that are provided in contact with the top and the bottom of the core region. A first optical waveguide that is provided in the optical circuit element is provided with a plurality of intersection points where the first optical waveguide intersects optical waveguides other than the first optical waveguide, said intersection points being disposed on one straight line. The core width of the first optical waveguide in a region between the intersection points is larger than the core width of the first optical waveguide in regions other than the region between the intersection points, the first optical waveguide regions having different core widths are connected by means of a taper optical waveguide wherein the core width monotonously changes, and the thickness of the slab of the first optical waveguide in the region having the large core width is larger than the (Continued)

thickness of the slab of the first optical waveguide in the regions other than the region having the large core width.

5 Claims, 13 Drawing Sheets

(56) References Cited

FOREIGN PATENT DOCUMENTS

| JP | 2006-525556 A | 11/2006 |
| JP | 2011-090223 A | 5/2011 |
| JP | 2014-002239 A | 1/2014 |

OTHER PUBLICATIONS

English translation of Written opinion for PCT Application No. PCT/JP2015/004646.

\* cited by examiner

OPTICAL CIRCUIT ELEMENT AND CONFIGURATION METHOD FOR THE OPTICAL CIRCUIT ELEMENT

This application is a National Stage Entry of PCT/JP2015/004646 filed on Sep. 11, 2015, which claims priority from Japanese Patent Application 2014-192232 filed on Sep. 22, 2014, the contents of all of which are incorporated herein by reference, in their entirety.

TECHNICAL FIELD

The present invention relates to an optical circuit element and a configuration method for the optical circuit element and, particularly, relates to an optical circuit element that is to be used in optical communication systems and optical interconnect systems and a configuration method for the optical circuit element.

BACKGROUND ART

In optical communication systems and optical interconnect systems, a technology that constructs an optical circuit by using an optical waveguide is important. And, for size reduction and electric power reduction of the systems, development of function integration in optical circuits is expected. In recent years, the attention drawn to a technology termed silicon photonics that employs a silicon optical waveguide as means for function integration in an optical circuit has been increasing.

In a silicon optical waveguide, by using silicon as a core and silica as a cladding and exploiting a high refractive index difference between the core and the cladding, and a fine core structure, strong light confinement effect can be obtained. By using such a silicon optical waveguide, an optical circuit that provides a high degree of integration is expected to be made. Furthermore, such a minute and highly integrated optical circuit can be fabricated on a large size wafer by exploiting process technologies accumulated for silicon LSI (large scale integration), which is also a major reason why silicon photonics is drawing attention.

FIG. 10 and FIG. 11 illustrate an example of a structure of a silicon optical waveguide. FIG. 10 is a diagram illustrating a general structure of a channel type optical waveguide. A channel structure 23 of silicon is formed in a silica layer 22 on a silicon substrate 21. The channel structure 23 functions as a core of the optical waveguide and the silica layer 22 functions as a cladding of the optical waveguide.

FIG. 11 is a diagram illustrating a general structure of a rib type optical waveguide. A silica layer 25, a silicon layer 26, and a silica layer 27 are stacked on a silicon substrate 24. A protruding structure 28 termed rib or ridge is formed on the silicon layer 26. In this structure, the light confinement in a direction perpendicular to the substrate is realized by a refractive index difference between silicon and silica. Furthermore, the light confinement in a direction parallel to the substrate is realized by an effective refractive index difference between thick silicon provided with the rib and thin silicon (slab) not provided with the rib.

In constructing highly integrated optical circuit by using a silicon optical waveguide, an element technology for realizing intersection of optical waveguides is very important. At an intersection point at which a plurality of optical waveguides intersect, it is difficult to avoid occurrence of diffraction in an optical signal propagating through an optical waveguide. PTL 1 and PTL 2 describe element structures for reducing the loss of an optical signal involved with diffraction.

FIG. 12 is a diagram illustrating a first example of a general optical circuit element that has an intersection point of optical waveguides. FIG. 12 is a diagram of a structure of cores of the optical waveguides that form the intersection point, viewed from an upper surface. One optical signal propagates from an incoming side 51 to an outgoing side 54 of an optical waveguide and another optical signal propagates from an incoming side 55 to an outgoing side 58. The optical waveguide that propagates the optical signal from the incoming side 51 to the outgoing side 54 and the optical waveguide that propagates the optical signal from the incoming side 55 to the outgoing side 58 intersect at an intersection point 59. The core width of each optical waveguide is enlarged at the intersection point 59. And, taper portions 52, 53, 56, and 57 are provided in the optical waveguides. The core width of the taper portions 52, 53, 56, and 57 is gradually enlarged toward the intersection point 59.

A fundamental mode 60 schematically illustrated in FIG. 12 illustrates a unimodal light intensity distribution in an optical waveguide core. In a portion of the optical waveguide whose core width is enlarged, the fundamental mode 60 propagating in the optical waveguide is less easily affected by changes in the width of a side wall of the core and the state of the side wall, so that the loss of the optical signal involved with diffraction at the intersection point 59 can be reduced.

In FIG. 12, with regard to the intersection of optical waveguides, illustration is made with a viewpoint focused on reduction of the loss of an optical signal that passes through a location of intersection. However, as the integration scale of an optical circuit increases, the influence of an optical signal passing through a plurality of intersection points provided on an optical waveguide becomes unignorable. For example, PTL 3 describes an optical circuit element in which a plurality of intersection points are disposed on a straight line on an optical waveguide.

FIG. 13 is a diagram illustrating a second example of a general optical circuit element that has intersection points of optical waveguides. FIG. 13 is a top view of a structure of optical waveguide cores that form the intersection points. A first optical signal propagates from an incoming side 61 to an outgoing side 62 of an optical waveguide. Furthermore, three optical waveguides intersect the optical waveguide in which the first optical signal propagates, at intersection points 69, 70, and 71, respectively. The interval between the intersection point 69 and the intersection point 70 is d1 and the interval between the intersection point 70 and the intersection point 71 is d2.

There are cases where the diffraction of an optical signal at an intersection of optical waveguides generates a fundamental mode that propagates in a direction opposing the optical signal, resulting in generation of reflected light. If, in such a case, a plurality of intersection points are disposed at equal intervals, an effect as a diffraction grating occurs in the optical circuit element and a loss dependent on wavelength occurs. To avoid this, the optical circuit element illustrated in FIG. 13 is provided with the interval d1 and the interval d2 that are different. A difference equal to or more than a certain value is provided between d1 and d2. Due to this, the optical circuit element illustrated in FIG. 13, while being incapable of reducing the loss at an intersection point at one location, can reduce the wavelength dependency of the loss that occurs due to a plurality of intersection points.

CITATION LIST

Patent Literature

[PTL 1] Japanese Laid-open Patent Publication No. 5-60929
[PTL 2] Japanese Laid-open Patent Publication No. 2011-90223
[PTL 3] Japanese Laid-open Patent Publication No. 2014-2239

SUMMARY OF INVENTION

Technical Problem

In increasing the integration scale of an optical circuit element, a further reduction of the loss due to intersection of optical waveguides that constitute the optical circuit element is required. Furthermore, in many cases, an optical circuit element is required to have a characteristic of not being dependent on polarization of an optical signal that propagates through an optical waveguide. This reduction of loss and elimination of polarization dependency cannot be sufficiently achieved solely by well-known technologies. Furthermore, occurrence of diffraction resulting from an optical signal passing through an intersection of optical waveguides is unavoidable. And PTL 1 and PTL 2, while describing technologies that reduce the diffraction that occurs at an intersection point of optical waveguides, do not refer to the handling of diffracted light that occurs.

The optical waveguides connected to the input and output sides of an intersection point propagate only the fundamental mode. On the other hand, in a case where at an intersection point, the core width of an optical waveguide is enlarged to form a multimode optical waveguide, occurrence of diffraction can cause conversion of the energy of an optical signal from the fundamental mode to a higher mode, which may be to a slight extent. In order to pursue a further reduction of the loss at an intersection point, it becomes important to not only minimize the conversion to higher modes at an intersection point but also exploit generated higher modes. In a case where higher modes experience high optical loss, the conversion to higher modes results in the increase in a loss of the fundamental mode passing through the intersection. In a case where higher modes experience low optical loss, a result of inter-mode interference between the fundamental mode and the higher modes increases or decreases the optical loss of the fundamental mode passing through the intersection. When the fundamental mode and the higher modes interfere constructively, the optical loss of the fundamental mode passing through the intersection can be reduced.

Still further, for the elimination of dependency on polarization, it is necessary to cause different polarized components to have substantially equal extents of inter-mode interference. That is, to control the higher mode that is generated at an intersection point is important in order to realize reduction of loss and elimination of polarization dependency. Control of the higher mode that is generated at an intersection point is particularly important in an optical circuit element that has a structure in which an optical signal passes through a plurality of intersection points. However, the technology described in PTL 3 is left without a mention about such control of a higher mode component.

Object of Invention

An object of the present invention is to provide an optical circuit element and a configuration method for the optical circuit element which solve a task of causing an optical signal to pass with low loss and low polarization dependency.

Solution to Problem

An optical circuit element of the present invention is an optical circuit element constructed of a rib type optical waveguide constructed of a core region that includes a flat platy slab and a protruding rib and cladding regions that are provided in contact with a top and a bottom of the core region, and is characterized in that a first optical waveguide included in the optical circuit element includes a plurality of intersection points at which the first optical waveguide intersects optical waveguides other than the first optical waveguide, the plurality of intersection points are disposed on one straight line, a core width of the first optical waveguide in a region between the intersection points is wider than a core width of the first optical waveguide in a region that is not between the intersection points, regions of the first optical waveguide that are different in the core width from each other are interconnected by a taper optical waveguide whose core width monotonously changes, and a thickness of the slab of the first optical waveguide in a region whose core width is wide is larger than a thickness of the slab of the first optical waveguide in regions other than the region whose core width is wide.

An optical circuit element of the present invention is an optical circuit element constructed of a rib type optical waveguide constructed of a core region that includes a flat platy slab and a protruding rib and cladding regions that are provided in contact with a top and a bottom of the core region, and is characterized in that a first optical waveguide included in the optical circuit element includes a plurality of intersection points at which the first optical waveguide intersects optical waveguides other than the first optical waveguide, the plurality of intersection points are disposed on one straight line, a region in the first optical waveguide that is formed between the plurality of intersection points is constructed as a first region in which an optical signal, including a fundamental mode and a higher mode, propagates, the first region and a second region in which the optical signal, including only the fundamental mode, propagates, in regions in the first optical waveguide, are interconnected by a taper optical waveguide, and a thickness of the slab of the first region is set in such a way that loss and polarization dependency in the higher mode are reduced.

A configuration method for an optical circuit element of the present invention is a configuration method for an optical circuit element constructed of a core region that includes a flat platy slab and a protruding rib and cladding regions that are provided in contact with a top and a bottom of the core region, and is characterized in that a plurality of intersection points at which a first optical waveguide included in the optical circuit element intersects optical waveguides other than the first optical waveguide are disposed on the first optical waveguide, the plurality of intersection points are disposed on one straight line, a core width of the first optical waveguide in a region between the plurality of intersection points is set wider than a core width of the first optical waveguide in regions other than the region between the intersection points, regions of the first optical waveguide that are different in the core width from each other are interconnected by a taper optical waveguide whose core width monotonously changes, and a thickness of the slab of the first optical waveguide in a region whose core width is wide is set larger than a thickness of the slab of the first optical waveguide in regions other than the region whose core width is wide.

A configuration method for an optical circuit element of the present invention is a configuration method for an optical circuit element constructed of a core region that includes a flat platy slab and a protruding rib and cladding regions that are provided in contact with a top and a bottom of the core region, and is characterized in that a plurality of intersection points at which a first optical waveguide included in the optical circuit element intersects optical waveguides other than the first optical waveguide are disposed on the first optical waveguide, the plurality of intersection points are disposed on one straight line, a region in the first optical waveguide that is formed between the plurality of intersection points is constructed as a first region in which an optical signal, including a fundamental mode and a higher mode, propagates, the first region and a second region in which the optical signal, including only the fundamental mode, propagates, in regions in the first optical waveguide, are interconnected by a taper optical waveguide, and as for a thickness of the slab of the first region, the thickness of the slab is set in such a way as to reduce structure heterogeneity and polarization dependency of the core region.

Advantageous Effects of Invention

The optical circuit element and the configuration method for the optical circuit element of the present invention realize an optical circuit element capable of passing an optical signal with low loss and low polarization dependency.

DESCRIPTION OF EXAMPLE EMBODIMENTS

Figure 1:
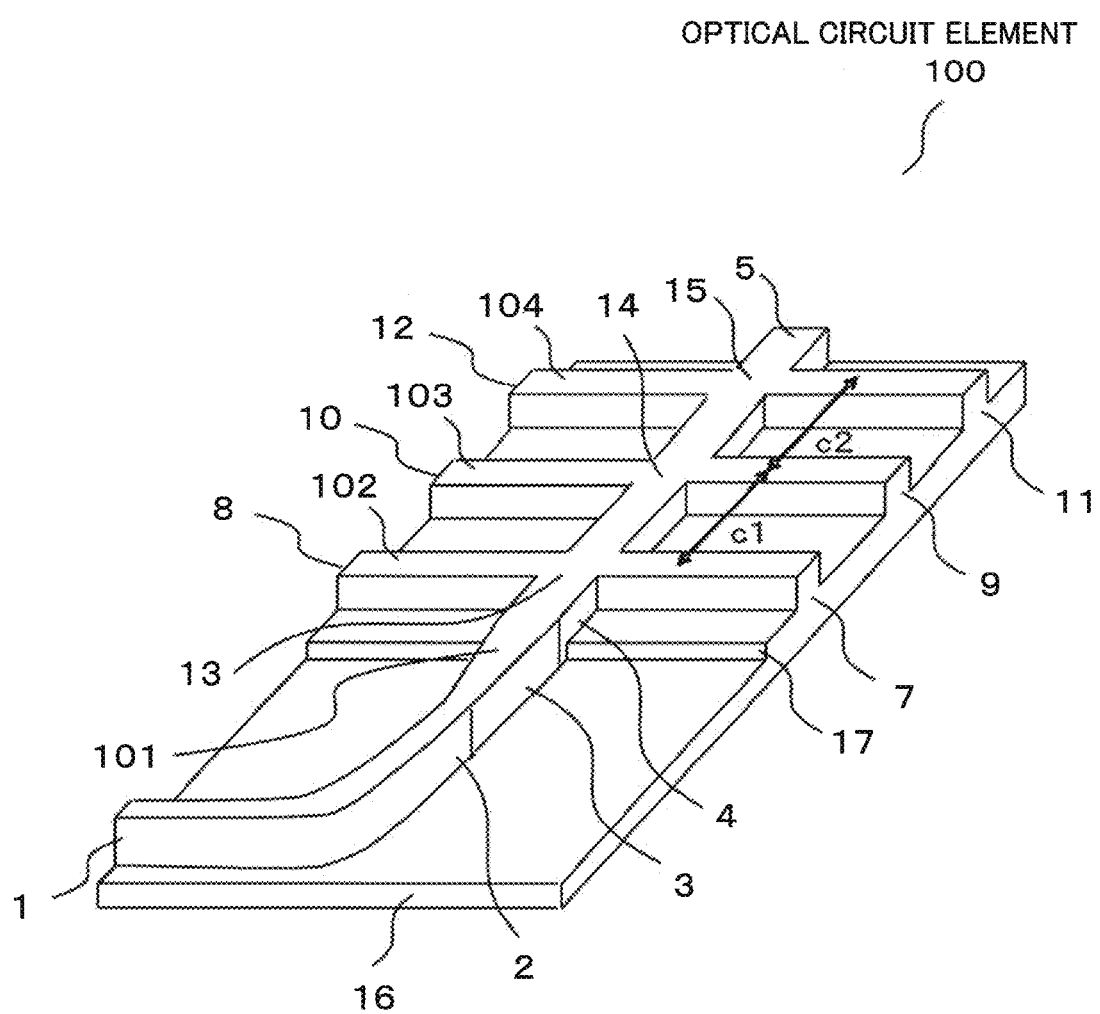
FIG. 1 is a block diagram of an optical circuit element of a first example embodiment.
Figure 2:
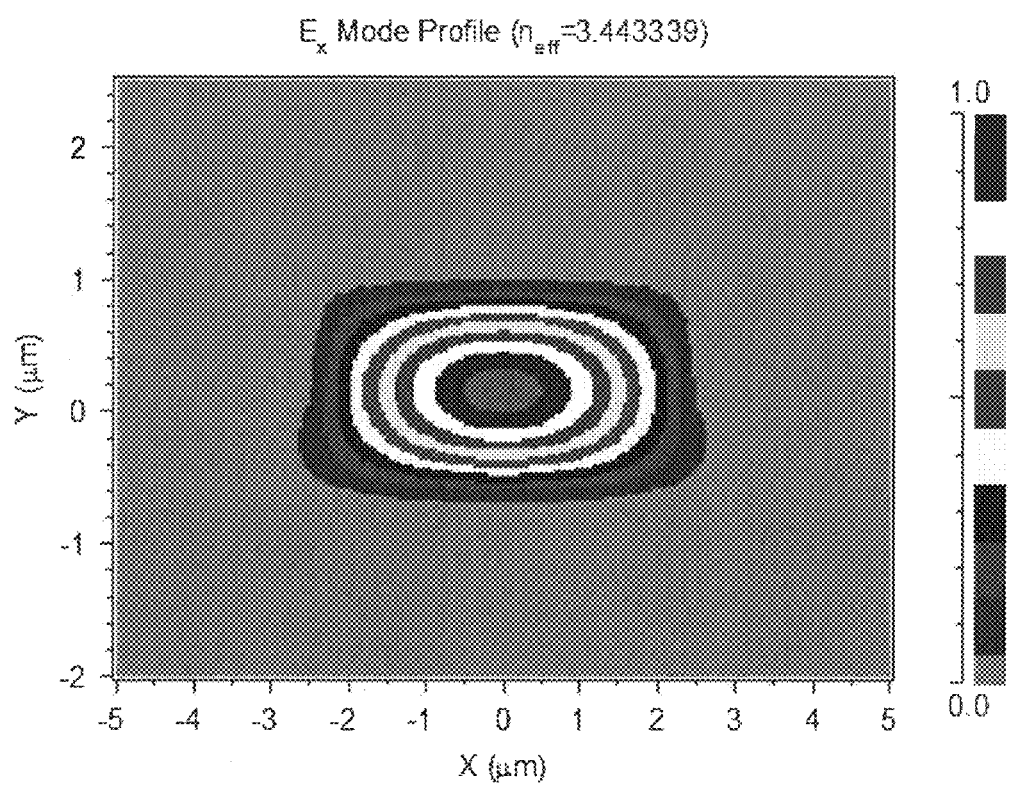
FIG. 2 is a diagram illustrating an example of calculation results of a light intensity distribution in a cross-section of an optical waveguide of a fundamental mode (zero order).
Figure 3:
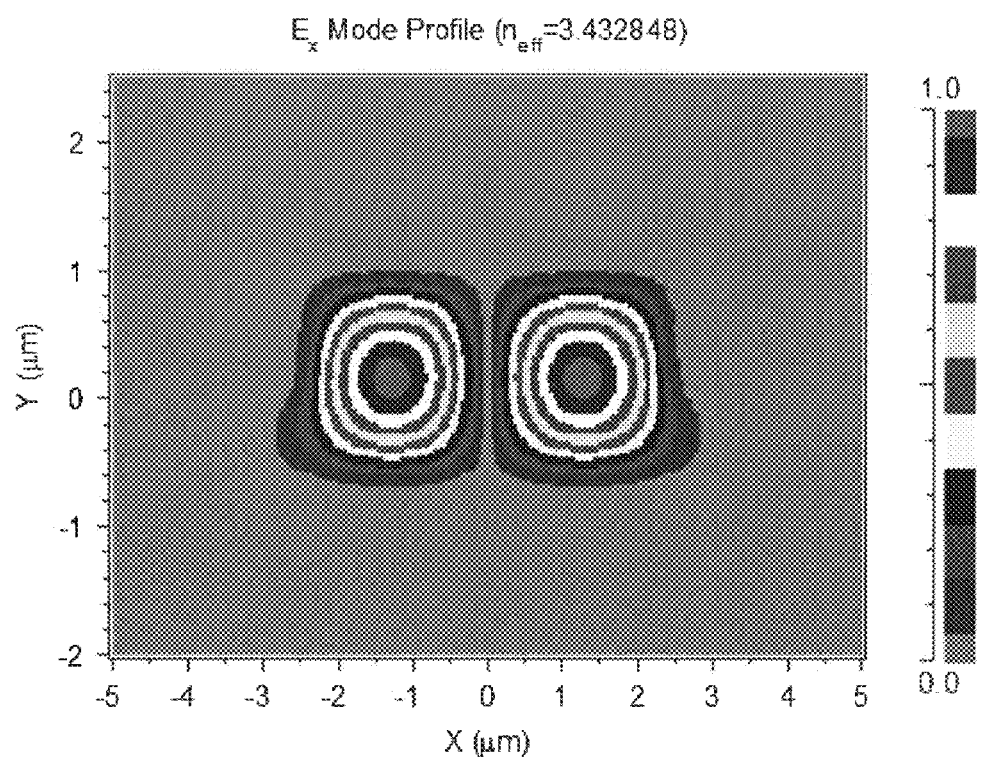
FIG. 3 is a diagram illustrating an example of calculation results of a light intensity distribution in a cross-section of an optical waveguide of a higher mode (first order).
Figure 4:
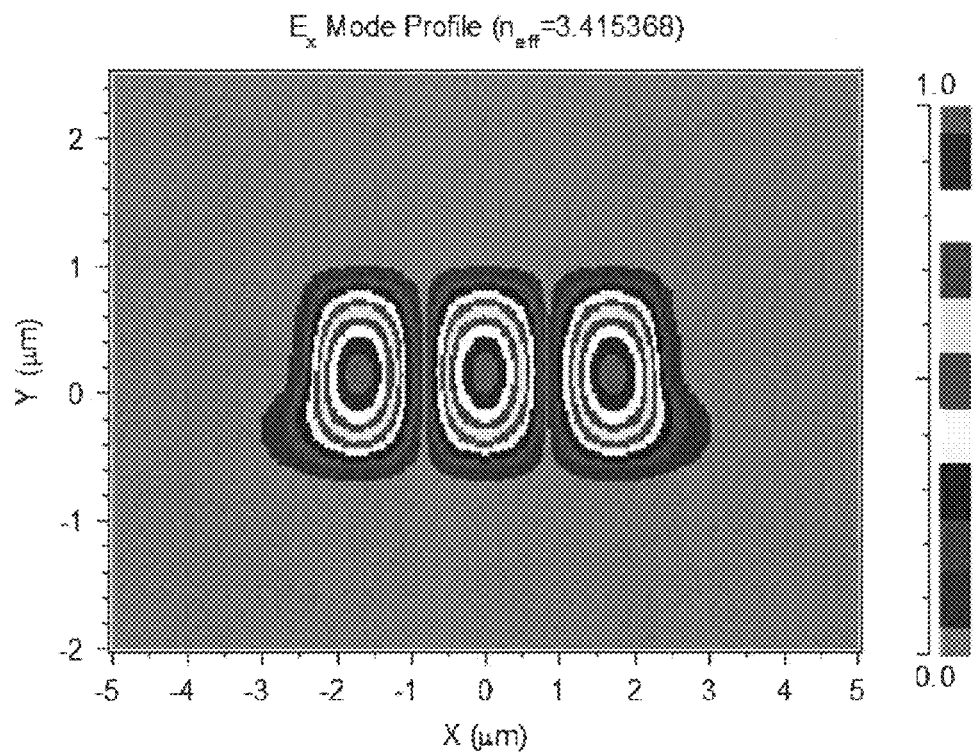
FIG. 4 is a diagram illustrating an example of calculation results of a light intensity distribution in a cross-section of an optical waveguide of a higher mode (second order).
Figure 5:
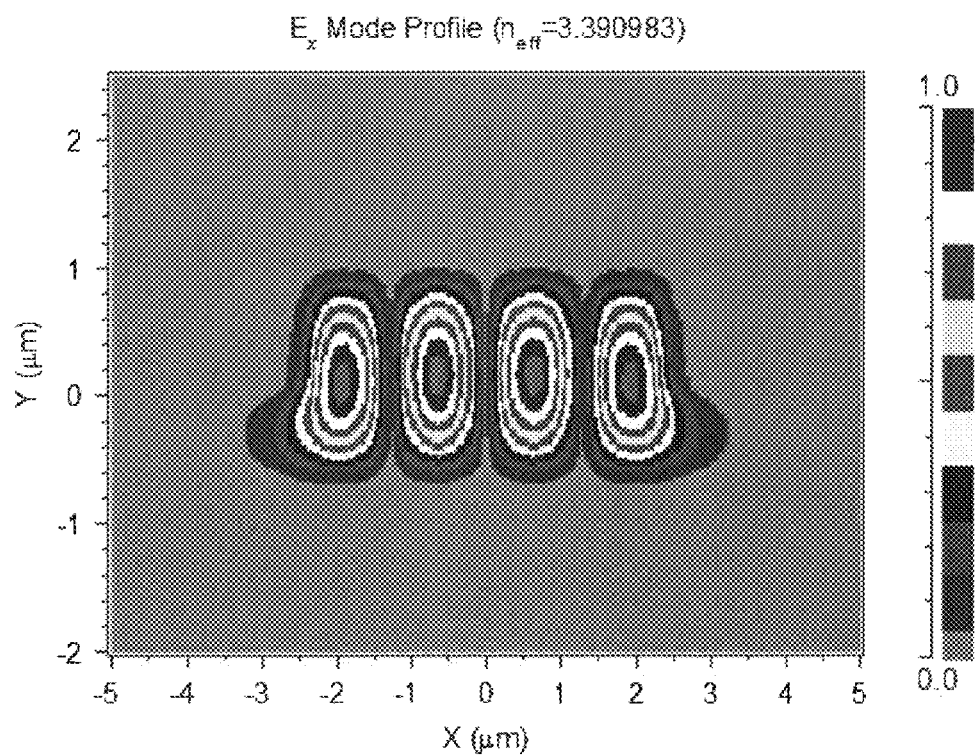
FIG. 5 is a diagram illustrating an example of calculation results of a light intensity distribution in a cross-section of an optical waveguide of a higher mode (third order).
Figure 6:
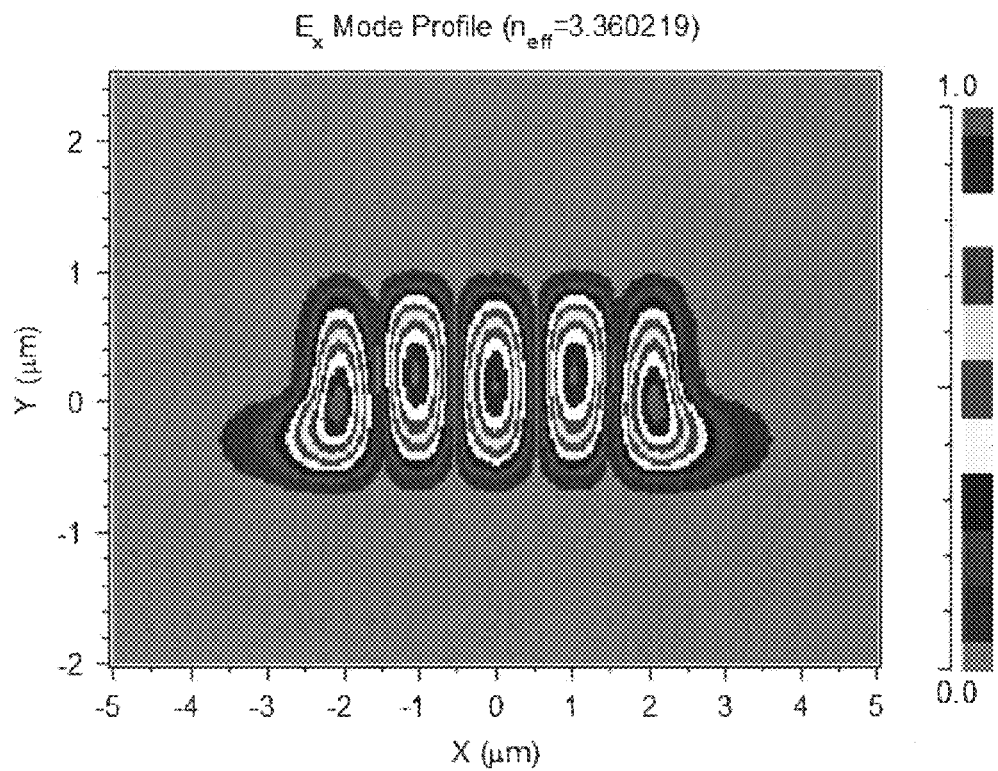
FIG. 6 is a diagram illustrating an example of calculation results of a light intensity distribution in a cross-section of an optical waveguide of a higher mode (fourth order).

Next, a first example embodiment of the present invention will be described with reference to FIG. 1. FIG. 1 is a block diagram of an optical circuit element 100 of the first example embodiment of the present invention. The optical circuit element 100 includes a first optical waveguide 101 and second to fourth optical waveguides 102 to 104 that intersect the first optical waveguide 101. The first optical waveguide 101 includes a region 1, a region 2, a region 3, a region 4, and a region 5. The optical signal propagates through the regions 1 to 5 in order. The second optical waveguide 102 propagates optical signals from a region 7 to a region 8. The third optical waveguide 103 propagates optical signals from a region 9 to a region 10. The fourth optical waveguide 104 propagates optical signals from a region 11 to a region 12.

Figure 11:
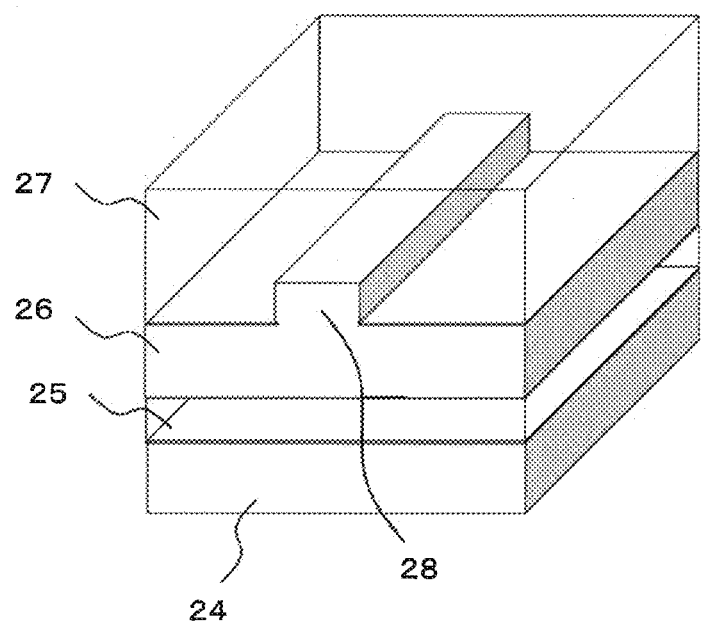
FIG. 11 is a diagram illustrating a general structure of a rib type optical waveguide.
Figure 12:
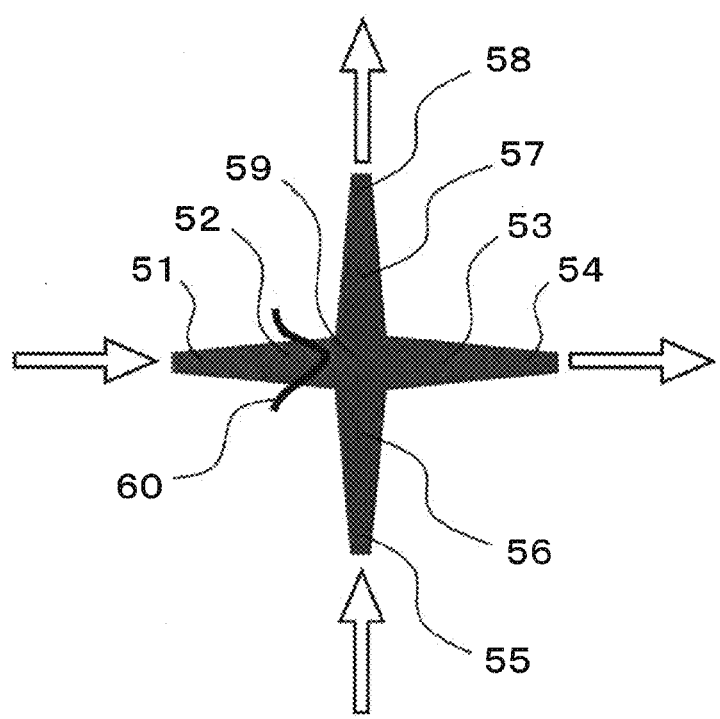
FIG. 12 is a diagram illustrating a first example of a general optical circuit element that has an intersection point of optical waveguides.
Figure 13:
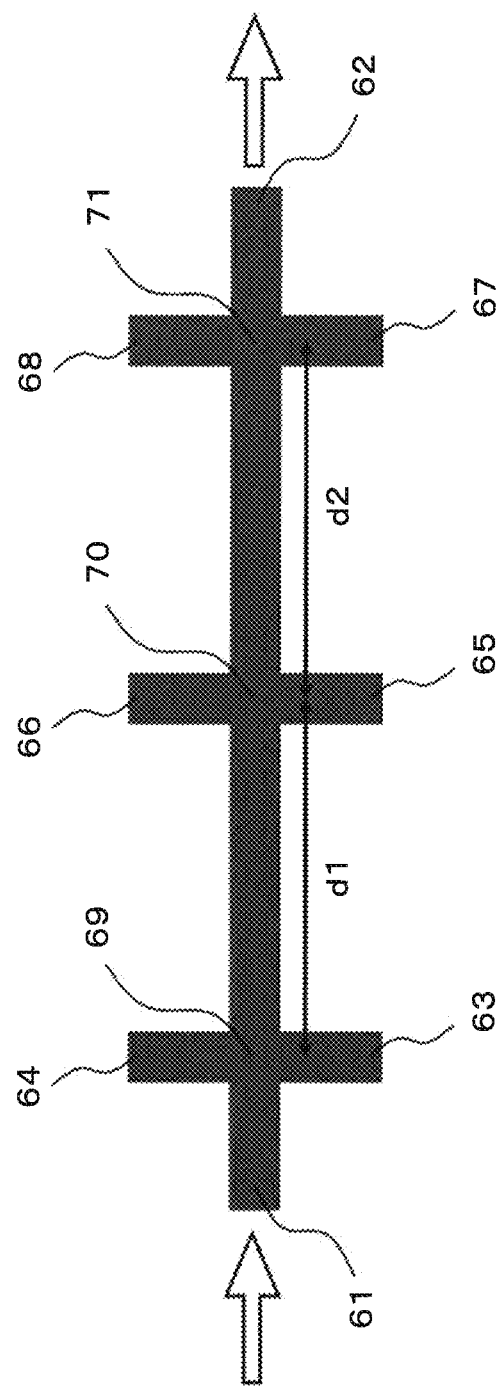
FIG. 13 is a diagram illustrating a second example of a general optical circuit element that has intersection points of optical waveguides.

The first to fourth optical waveguides 101 to 104 are substantially the same rib type optical waveguides as in FIG. 11. FIG. 1 illustrates only a structure of silicon of the first to fourth optical waveguides 101 to 104 and does not illustrate silica layers formed in contact with the top and bottom of the structure of silicon. In the first optical waveguide 101, an optical waveguide from the region 1 to the region 2 which includes a curved optical waveguide is connected to the region 3 that is a taper optical waveguide whose rib width gradually increases and the region 4 and the region 5 that are straight broad rib type optical waveguides in order. Intersection points 13, 14, and 15 between the first optical waveguide 101 and the second to fourth optical waveguides 102 to 104 are disposed on the broad rib type optical waveguide. The region 4 includes inter-intersection-point regions between the intersection points 13 to 15. The interval between the intersection point 13 and the intersection point 14 is c1 and the interval between the intersection point 14 and the intersection point 15 is c2.

The broad rib type optical waveguide (hereinafter, referred to as "broad waveguide") has a wider rib width than an optical waveguide that propagates only optical signals of the fundamental (zero order) mode. Due to this, in the broad waveguide, higher modes of the first and higher orders can also exist as waveguide modes. Therefore, when an optical signal is propagated from the region 1 to the region 5, higher modes occur, although slightly, at the intersection points 13 to 15. The optical signals of higher modes generated at the intersection points 13 to 15 propagate through the broad waveguide.

FIG. 2 to FIG. 6 are each a diagram illustrating an example of calculation results of a light intensity distribution in a cross-section of an optical waveguide of the fundamental mode (zero order) or a higher mode of one of the first order to the fourth order that can exist as a waveguide mode, with regard to a rib type optical waveguide whose rib formation portion has a silicon thickness of 1.5 μm and a rib width of 5.0 μm. The horizontal axis X indicates the measure in a rib width direction and the vertical axis Y indicates the measure in a silicon thickness (i.e., rib height) direction of a rib formation portion. In FIG. 2 to FIG. 6, the light intensity has been normalized assuming that a center portion in which the light intensity distribution is highest is given 1. As is apparent from the drawings, in an n-order (n is a natural number) mode there occurs a distribution of light intensity that has (n+1) number of peaks. The light intensity, in any case, is highest at or near the centers of the distribution and smaller toward the peripheries.

In the broad waveguide, because these modes propagate, inter-mode interference occurs. In the broad waveguide, in a case where the input and output thereof are connected to optical waveguides that propagate only the fundamental mode, the light intensity of the fundamental mode is overwhelmingly greater than the light intensities of the higher modes. Due to this, the inter-mode interference between the fundamental mode and a higher mode most greatly affects optical signal transmission property. For example, results of the inter-mode interference between the fundamental mode and a higher mode that occurs when an optical signal passes through the intersection point 13 affect the conversion to a higher mode at the next intersection point 14.

That is, if, as a result of the foregoing inter-mode interference, the fundamental mode and the higher mode interfere constructively at the intersection point 14 and the light intensity distribution concentrates to an inner side in a cross-section of the optical waveguide, a further conversion to higher modes is minimized. Conversely, if, at the intersection point 14, the fundamental mode and the higher mode interfere destructively and the light intensity distribution spreads to outer sides in a cross-section of the optical waveguide, a further conversion to higher modes more easily occurs.

On another hand, the inter-mode interference is affected also by the relation between the beat length between modes and the distance between intersection points. Because the fundamental mode and the higher modes are different in the propagation speed of light, inter-mode interference results in optical signals of the respective modes interfering constructively or destructively according to the propagation distance. This period is the beat length between the modes. When the distance between intersection points is an integer multiple of the beat length, the interference between the fundamental mode and the higher mode is interfering constructively. When the distance between the intersection points is a half-integer multiple of the beat length, the interference between the fundamental mode and the higher mode is interfering destructively.

As for the thickness of silicon of slabs in contact with the rib in the optical circuit element 100 illustrated in FIG. 1, a slab region 17 in contact with the broad rib type optical waveguide on which the intersection points 13 to 15 are disposed is thicker than a slab region 16 in contact with a portion from the region 1 to the region 2 that includes a curved waveguide. Generally, in a region that includes a curved waveguide, enhancing the light confinement in a direction horizontal to the substrate is more desirable in pursuing size reduction of the optical circuit by reducing the bend radius of the optical waveguide. Due to this, in the regions 1 and 2 that include the curved waveguide, it is more desirable that the slab in contact with the rib be thin.

In contrast, in the regions 4 and 5 of the straight broad waveguide on which the plurality of intersection points are disposed, it is more desirable that the slab in contact with the rib be thick for the control of the higher mode for the purpose of the reduction of loss and reduction of polarization dependency of the optical signals that pass through the intersection points. Hereinafter, advantageous effects of the higher mode control obtained by thickening the silicon of the slab region 17 in contact with the broad waveguide will be described.

A first advantageous effect obtained by thickening the silicon in the slab region 17 is that the loss in higher modes is reduced. As illustrated in FIG. 2 to FIG. 6, in the fundamental mode (FIG. 2), the light intensity is mostly distributed relatively inward in the rib width whereas, in higher modes (FIG. 3 to FIG. 6), regions in which light intensity is high spread to the entire rib width (±2.5 μm) as the order increases. As an optical signal of a higher mode spreads to the entire rib width, the propagation property of the optical signal becomes more subject to influences of side walls of the rib structure. For example, the optical signal becomes more subject to the scattering due to roughness of the side walls. Therefore, lowering the rib side walls by thickening the slab in contact with the rib is effective in reducing the higher mode loss.

A second advantageous effect obtained by thickening the silicon in the slab region 17 is reduction of the polarization dependency caused by the inter-mode interference. As for the modes illustrated in FIG. 2 to FIG. 6, as the order increases, the propagation speed also increases and the effective refractive index of the optical waveguide decreases. In FIG. 2 to FIG. 6, examples of the effective refractive index are indicated as $n_{\text{eff}}$.

Figure 7:
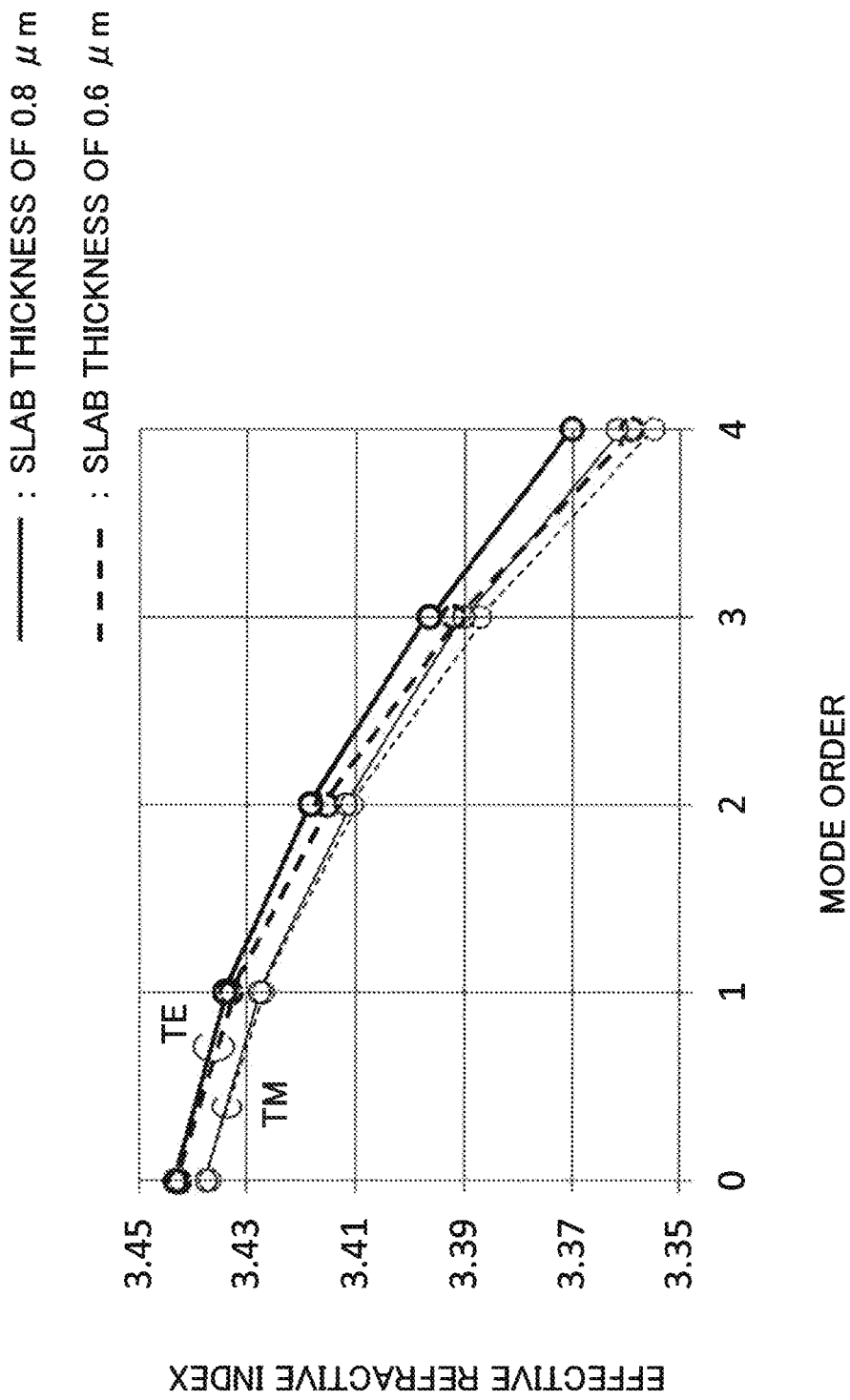
FIG. 7 is a diagram illustrating an example of effective refractive indexes of the zero order mode to the fourth order mode.

FIG. 7 is a diagram illustrating the effective refractive indexes of the zero order mode to the fourth order mode in a case where the rib formation portion has a silicon thickness of 1.5 μm and a rib width of 5.0 μm. As the order of a mode is higher, the effective refractive index decreases. The effective refractive index difference between the fundamental mode (zero order mode) and a higher mode of nth order is inversely proportional to $n \times (n+2)$. Furthermore, this effective refractive index is dependent on polarization. FIG. 7 illustrates individual effective refractive indexes with respect to TE (transverse electric) light having an electric field component substantially parallel to the substrate and TM (transverse magnetic) light having an electric field component substantially perpendicular to the substrate. The thick solid line and the thick interrupted line indicate TE light and the thin solid line and the thin interrupted line indicate TM light. Here, both solid lines indicate the case where the thickness of the slab is 0.8 μm and both interrupted lines indicate the case where the thickness of the slab is 0.6 μm.

Generally, the reciprocal of the difference in effective refractive index between the fundamental mode and a higher mode is proportional to the beat length. Meanwhile, in FIG. 7, compared with the case where the thickness of the slab is 0.6 μm, the case where the thickness of the slab is 0.8 μm indicates that the difference between TE light and TM light in the effective refractive index difference between the fundamental mode and a higher mode (particularly, the mode of the fourth order, which is the highest order) is small. The beat length between modes is proportional to the reciprocal of the effective refractive index difference between the modes. This means that, in the case where the slab is thick, compared with the case where the slab is thin, the difference in beat length between TE light and TM light is small. Therefore, by thickening the slab, the polarization dependency of the beat lengths of the fundamental mode and higher modes can be reduced.

As described above, in the optical circuit element 100 of the first example embodiment, the thickening of the slab of the broad waveguide reduces the loss in higher modes caused by the rib side walls and also reduces the polarization dependency of the beat lengths of the higher modes and the fundamental mode.

That is, in the optical circuit element 100 of the first example embodiment, it is possible to reduce the loss in higher modes occurring at intersection points by thickening the slab and pursue the reduction of the loss. Furthermore, in the optical circuit element 100 of the first example embodiment, the thickening of the slab reduces the influence of the polarization dependency of the beat length when the setting of the intervals between the intersection points for reduction of the loss is performed based on the beat length.

Thus, the optical circuit element 100 of the first example embodiment is capable of passing optical signals with low loss and low polarization dependency.

Anther Expression of Optical Circuit Element of First Example Embodiment

An optical circuit element that achieves substantially the same advantageous effects as the optical circuit element 100 of the first example embodiment is also described as follows. The reference signs of the corresponding component elements in FIG. 1 are indicated in parentheses. Specifically, the optical circuit element is constructed of a rib type optical waveguide constructed of a core region that includes flat platy slabs (16 and 17) and protruding ribs (1 to 5) and cladding regions that are provided in contact with the top and bottom of the core region. And a first optical waveguide (101) included in the optical circuit element 100 includes a plurality of intersection points (13 to 15) at which the first optical waveguide intersects other optical waveguides (102 to 104) other than the first optical waveguide. The intersection points are disposed on one straight line. Furthermore, the core width of the first optical waveguide in regions between the intersection points is wider than the core width of the first optical waveguide in a region (1 and 2) other than the regions between the intersection points. Regions (2 and 4) of the first optical waveguide whose core widths are different from each other are interconnected by a taper optical waveguide (3) whose core width monotonously changes. The width of the taper optical waveguide (3) may change smoothly or linearly between the regions (2 and 4) of the first optical waveguide. Furthermore, the thickness of the slab (17) of the first optical waveguide in the regions whose core width is wide is greater than the thickness of the slab (16) of the first optical waveguide in the region other than the regions whose core width is wide. In this optical circuit element, too, the thickening of the slab reduces the loss in higher modes and the polarization dependency of the beat length, so that it is possible to pass optical signals with low loss and low polarization dependency.

Still Another Expression of Optical Circuit Element of First Example Embodiment

An optical circuit element that achieves substantially the same advantageous effects as the optical circuit element 100 of the first example embodiment can further be expressed as follows. The reference signs of the corresponding component elements in FIG. 1 are indicated in parentheses. Specifically, the optical circuit element is an optical circuit element constructed of a rib type optical waveguide constructed of a core region that includes flat platy slabs (16 and 17) and protruding ribs (1 to 5) and cladding regions that are provided in contact with the top and bottom of the core region. A first optical waveguide (101) included in the optical circuit element includes a plurality of intersection points (13 to 15) at which the first optical waveguide intersects other optical waveguides (102 to 104) other than the first optical waveguide. The plurality of intersection points are disposed on one straight line. And regions of the first optical waveguide formed between the plurality of intersection points are formed as a first region (4 to 5) that propagates optical signals, including the fundamental mode and higher modes. The first region and a second region (1 and 2) that propagates optical signals, including only the fundamental mode, among the regions of the first optical waveguide, are interconnected by a taper optical waveguide (3). Furthermore, the thickness of the slab (17) of the first region is set in such a way that the loss and the polarization dependency in higher modes are reduced. In this optical circuit element, too, because the loss in higher modes and the polarization dependency of the beat length are reduced, it is possible to pass optical signals with low loss and low polarization dependency.

Second Example Embodiment

In a second example embodiment of the present invention, a relation between the loss of an optical signal and the intervals of intersection points (hereinafter, referred to as "intersection intervals") when the optical signal propagates through the intersection points at three or more locations connected by a broad waveguide will be considered. In FIG. 1, the intersection interval between an intersection point 13 and an intersection point 14 is c1 and the intersection interval between an intersection point 14 and an intersection point 15 is c2. As described in the first example embodiment, it is desirable that an intersection interval be an integer multiple of the beat length of the fundamental mode and a higher mode (in particular, the highest mode among the waveguide modes), from the viewpoint of reduction of loss. In the case where the intersection interval is an integer multiple of the beat length, an optical signal that passes through a plurality of intersection points has an interference in which the higher mode having occurred at a certain intersection point interferes with the fundamental mode at the next intersection point in such a way that the modes enhance each other. As a result, a further higher mode is inhibited from occurring at the next intersection point.

However, there are cases where even though the relation between the modes in a cross-section of the optical waveguide at a specific wavelength or a specific measure is a relation suitable to the reduction of loss stated above, the condition of propagation of an optical signal deviates from the relation suitable to the reduction of the loss stated above. For example, the propagation conditions of an optical signal fluctuate depending on changes in the wavelength of the optical signal or the fluctuation of the structure of the optical waveguide. And, in the case where the intersection intervals are all equal, there is a risk that the increase of the loss in the case where such a deviation occurs may become large. So, in the second example embodiment, simulation results of the loss in an optical circuit element in the case where the intersection intervals have been set in such a way that not all the intersection intervals are equal will be described.

Figure 8:
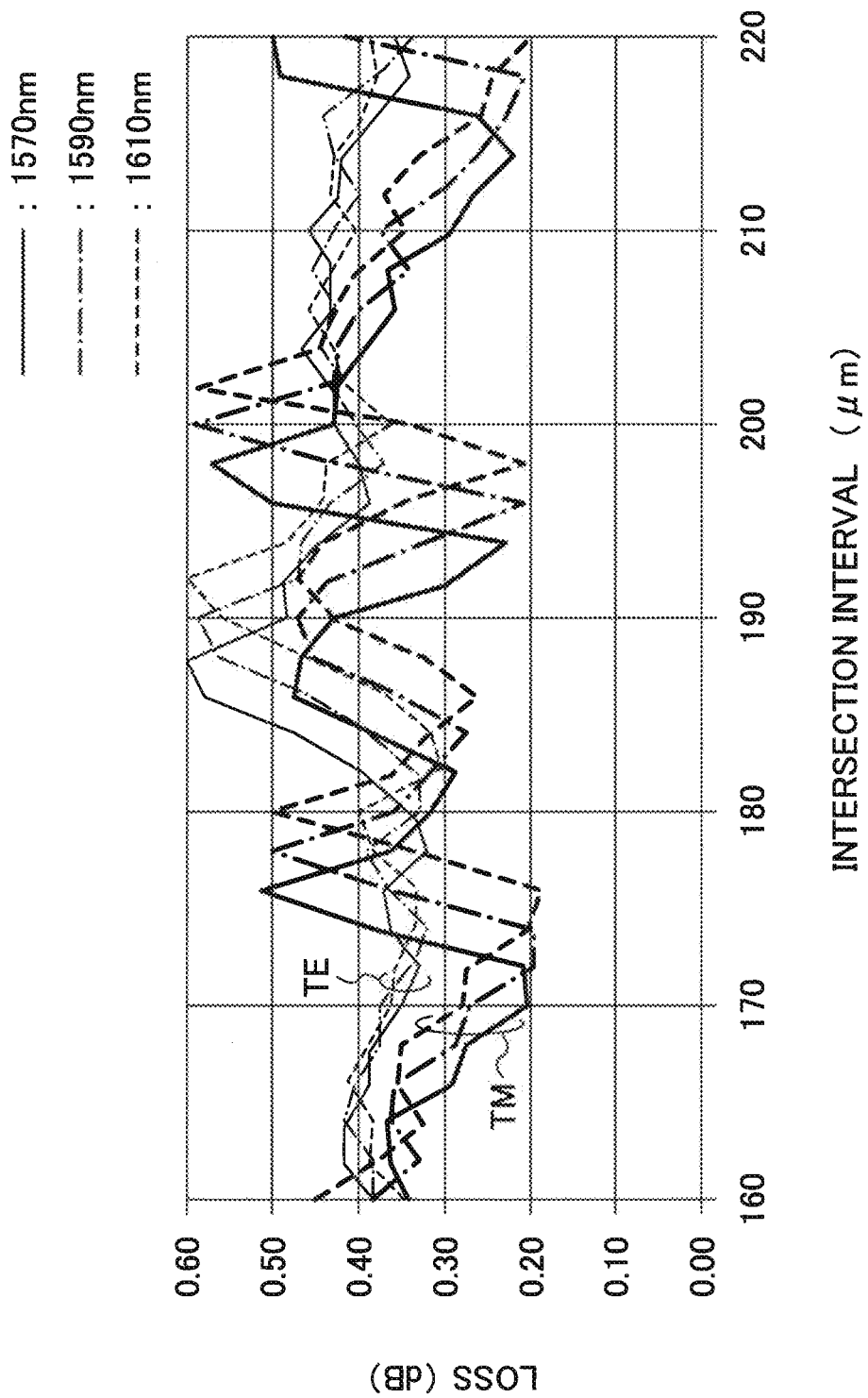
FIG. 8 is a diagram illustrating an example of simulation results of loss in an optical circuit element of a second example embodiment.
Figure 9:
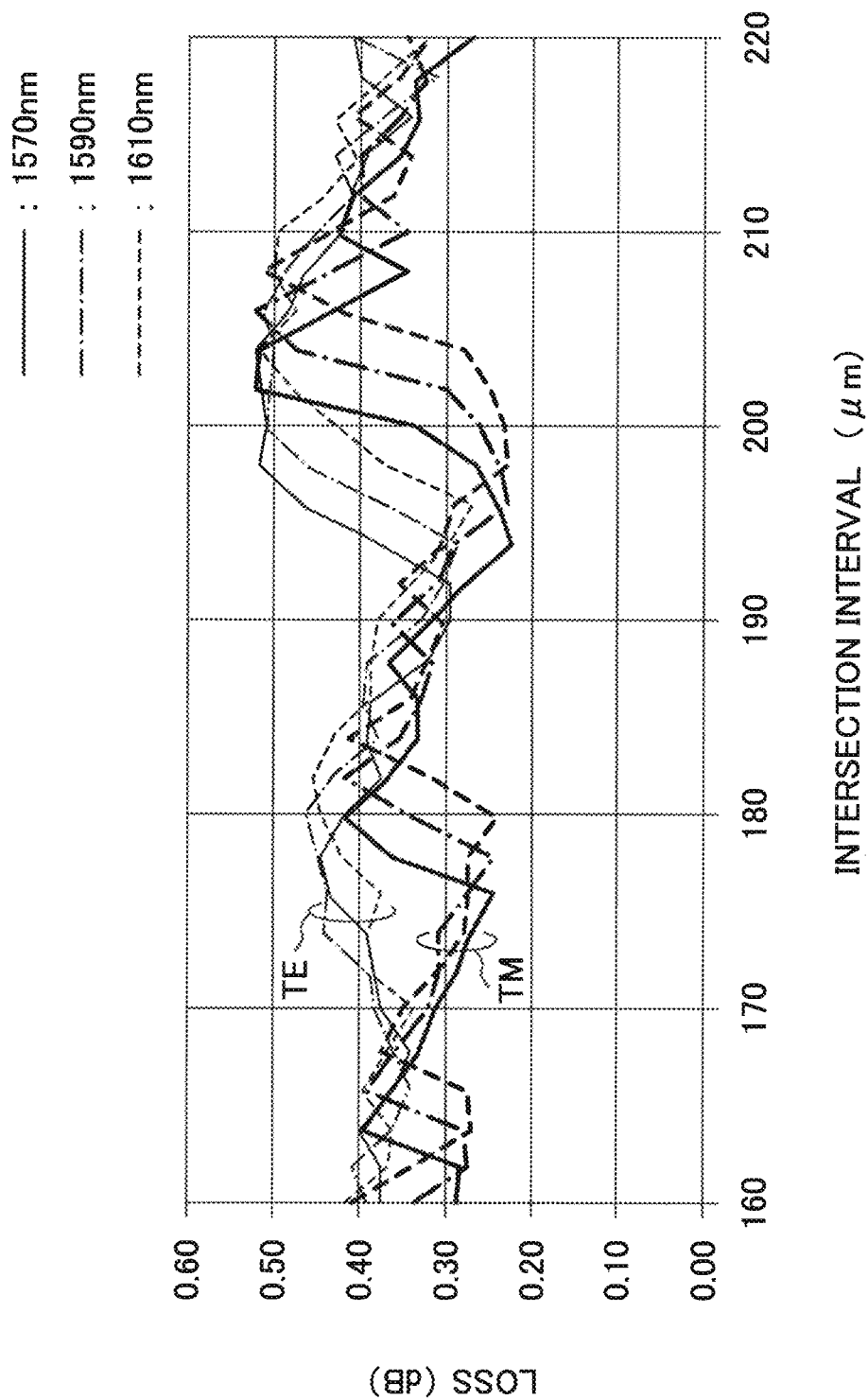
FIG. 9 is a diagram illustrating an example of simulation results of loss in an optical circuit element of the second example embodiment.
Figure 10:
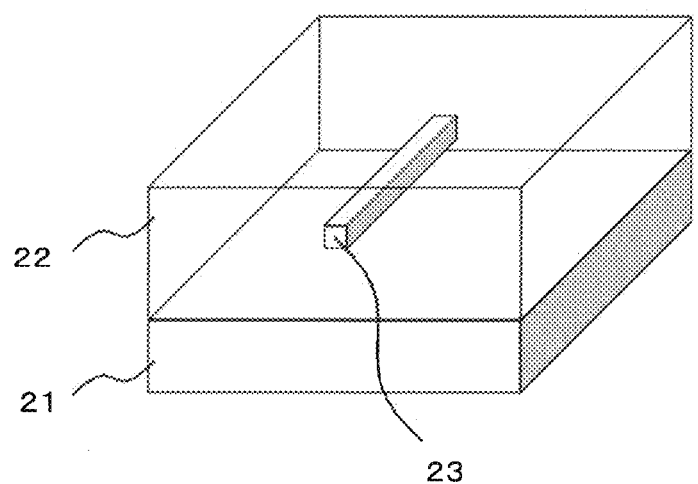
FIG. 10 is a diagram illustrating a general structure of a channel type optical waveguide.

The optical circuit element 100 of the first example embodiment illustrated in FIG. 1 is an optical circuit element in which the three intersection points 13 to 15 are disposed on a straight line and two sections between adjacent intersection points are connected by the broad waveguide. In the optical circuit element considered in the second example embodiment, the number of intersection points is greater than in the optical circuit element 100 illustrated in FIG. 1. In the optical circuit element of the second example embodiment, seven intersection points are disposed on a straight line and six sections between adjacent intersection points are connected by broad waveguides. FIG. 8 and FIG. 9 are diagrams illustrating examples of simulation results of the loss in the optical circuit element of the second example embodiment. The horizontal axis in FIG. 8 indicates the intersection interval and the vertical axis indicates the loss in the optical circuit element. In FIG. 8 and FIG. 9, the thick lines indicate TM light and the thin lines indicate TE light. With regard to the wavelengths of optical signals, regarding both TE light and TM light, the solid lines indicate 1570 nm, the one-dot chain line indicate 1590 nm, and interrupted lines indicate 1610 nm.

The range of the intersection intervals may be determined from the beat length between the modes of an optical signal. In the second example embodiment, the beat length Lb of the fundamental mode and a higher mode of the fourth order is about 20 μm and, corresponding to this, the intersection intervals are set within a certain range (±Lb/4=±5 μm) from a reference length L0. The intersection interval on the horizontal axis in FIG. 9 indicates values of the reference length L0.

FIG. 8 illustrates an example of simulation results of the loss in the optical circuit element in the case where the intersection intervals are changed while the intersection intervals are all kept equal (equal intervals). In FIG. 8, periodical fluctuations of the loss of an optical signal are shown for every change of about 20 μm in the intersection intervals. FIG. 9 illustrates an example of simulation results of the loss in the optical circuit element in the case where the intersection intervals of six sections are set to different values within the range of ±5 μm (unequal intervals). In the simulation, between the seven intersections (termed X1, X2, X3, X4, X5, X6, and X7 in order), the lengths of the six sections (between X1 and X2, between X2 and X3, between X3 and X4, between X4 and X5, between X5 and X6, and between X6 and X7) are changed as follows, by using the value of the reference length L0.

Between X1 and X2: L0+5 (μm)
Between X2 and X3: L0−5 (μm)
Between X3 and X4: L0
Between X4 and X5: L0+5 (μm)
Between X5 and X6: L0−5 (μm)
Between X6 and X7: L0

Compared with FIG. 8, FIG. 9 illustrates that the amplitude of fluctuation of the loss is smaller. Specifically, FIG. 9 illustrates that, by making the intersection intervals not all equal, the intersection interval dependency of the loss in the optical circuit element is reduced.

Here, there is a relation of (the beat length of the fundamental mode and the higher mode of the fourth order)=(⅛)× (the beat length of the fundamental mode and the higher mode of the first order). Therefore, if the beat length of the fundamental mode and the higher mode of the first order is represented by $L\pi$, the setting range of the intersection interval is represented by $L0 \pm L\pi/32$.

In the second example embodiment, the optical circuit element whose intersection intervals have been set in such a way as not to be all equal has been described. That is, in the optical circuit element of the second example embodiment, at least one intersection interval is set to a value different from another intersection interval. As the intersection intervals are set in this manner, the dependency of the loss of the optical circuit element on the intersection intervals is reduced in comparison with the case where the intersection intervals are set in such a way as to be all equal. And in the optical circuit element of the second example embodiment, too, it is also possible to carry out a further reduction of the loss of the optical circuit element while the polarization dependency remains small, by thickening the slab in contact with the rib as described in the first example embodiment.

While the invention of the present application has been described above with reference to the example embodiments, the invention of the present application is not limited to the foregoing example embodiments. The structure and details of the invention of the present application can be subjected to various changes that a person having ordinary skill in the art can understood within the scope of the invention of the present application. For example, in the foregoing example embodiments, the cases where the optical circuit element has a structure in which silicon is used as a core of a waveguide and silica glass is used as a cladding have been described. However, as the materials that form the core and the cladding, silica glass, compound semiconductors, organic materials, or the like may be used. That is, the materials of the optical circuit elements of the first and second example embodiments are not limited by the example embodiments.

Furthermore, the optical circuit elements described in the example embodiments can be widely applied to optical waveguide devices that have intersection points. For example, the optical circuit elements described in the example embodiments may be applied to 90-degree hybrid mixers, light modulators, optical matrix switches, and ring modulators.

This application claims the benefit of the priority based on Japanese Patent Application No. 2014-192232 filed on Sep. 22, 2014, the disclosure of which is incorporated herein in its entirety.

REFERENCE SIGNS LIST

100 Optical circuit element
101 to 104 First to fourth optical waveguides
1, 2 Region on the first optical waveguide 101
3 Region (taper optical waveguide) on the first optical waveguide 101
4, 5 Region (broad waveguide) on the first optical waveguide 101
7, 8 Region on the second optical waveguide 102
9, 10 Region on the third optical waveguide 103
11, 12 Region on the fourth optical waveguide 104
13 to 15 Intersection point
16, 17 Slab
21, 24 Silicon substrate
22, 25, 27 Optical waveguide cladding of silica
23, 26 Optical waveguide core of silicon
28 Rib structure of silicon
51, 55 Incoming side of the optical waveguide core
54, 58 Outgoing side of the optical waveguide core
52, 53, 56, 57 Taper portion
59 Intersection point
60 Fundamental mode
61, 63, 65, 67 Incoming side of the optical waveguide
62, 64, 66, 68 Outgoing side of the optical waveguide
69 to 71 Intersection point

What is claimed is:

1. An optical circuit element constructed of a rib type optical waveguide constructed of a core region that includes a flat platy slab and a protruding rib and cladding regions that are provided in contact with a top and a bottom of the core region, wherein a first optical waveguide included in the optical circuit element includes a plurality of intersection points at which the first optical waveguide intersects optical waveguides other than the first optical waveguide, the plurality of intersection points are disposed on one straight line, a core width of the first optical waveguide in a region between the intersection points is wider than a core width of the first optical waveguide in a region that is not between the intersection points, regions of the first optical waveguide that are different in the core width from each other are interconnected by a taper optical waveguide whose core width monotonously changes, and a thickness of the slab of the first optical waveguide in a region whose core width is wide is larger than a thickness of the slab of the first optical waveguide in regions other than the region whose core width is wide.

2. The optical circuit element according to claim 1, wherein the intersection points are disposed at three or more locations on the first optical waveguide and not all of intervals of the intersection points that are adjacent to each other are equal.

3. The optical circuit element according to claim 2, wherein a range in which the intervals of the intersection points are set to values that are not equal is set, by using a reference length L0 and a beat length Lπ of a fundamental mode and a higher mode of a first order that is determined by a structure of the first waveguide of the region whose core width is wide, to L0±Lπ/32.

4. An optical circuit element constructed of a rib type optical waveguide constructed of a core region that includes a flat platy slab and a protruding rib and cladding regions that are provided in contact with a top and a bottom of the core region, wherein a first optical waveguide included in the optical circuit element includes a plurality of intersection points at which the first optical waveguide intersects optical waveguides other than the first optical waveguide, the plurality of intersection points are disposed on one straight line, a region in the first optical waveguide that is formed between the plurality of intersection points is constructed as a first region in which an optical signal, including a fundamental mode and a higher mode, propagates, the first region and a second region in which the optical signal, including only the fundamental mode, propagates in the first optical waveguide, are interconnected by a taper optical waveguide, and a thickness of the slab of the first region is larger than a thickness of the slab of the second region reducing loss and polarization dependency in the higher mode.

5. A configuration method for an optical circuit element constructed of a core region that includes a flat platy slab and a protruding rib and cladding regions that are provided in contact with a top and a bottom of the core region, wherein a plurality of intersection points at which a first optical waveguide included in the optical circuit element intersects optical waveguides other than the first optical waveguide are disposed on the first optical waveguide, the plurality of intersection points are disposed on one straight line, a core width of the first optical waveguide in a region between the plurality of intersection points is set wider than a core width of the first optical waveguide in regions other than the region between the intersection points, regions of the first optical waveguide that are different in the core width from each other are interconnected by a taper optical waveguide whose core width monotonously changes, and a thickness of the slab of the first optical waveguide in a region whose core width is wide is set larger than a thickness of the slab of the first optical waveguide in regions other than the region whose core width is wide.

* * * * *